J. G. MILLER.

HAME TUG.

No. 10,981. Reissued Jan. 29, 1889.

Witnesses,

L. Mann,

Frederick F. Goodwin

Inventor

John G. Miller

By, Offield and Crane, Att'ys.

N. PETERS, Photo-Lithographer, Washington, D. C.

UNITED STATES PATENT OFFICE.

JOHN G. MILLER, OF CHAMPAIGN, ILLINOIS.

HAME-TUG.

SPECIFICATION forming part of Reissued Letters Patent No. 10,981, dated January 29, 1889.

Original No. 348,987, dated September 14, 1886. Application for reissue filed November 5, 1887. Serial No. 254,443.

*To all whom it may concern:*

Be it known that I, JOHN G. MILLER, a citizen of the United States, residing at Champaign, in the county of Champaign and State of Illinois, have invented a certain new and useful Improvement in Hame Tugs, which I desire to protect by Letters Patent of the United States, and of which the following is a specification.

The object of my invention is to provide a satisfactory joint between the buckle, as tugs are usually constructed, and the clip or eye by which the tug is attached to the hame. To obviate the tendency of the leather tug to break at such points, it becomes important to provide a joint between the hame and buckle constructed of metal. To protect the horse from being chafed by the tug, it is of great importance that this joint should be flexible in an outward direction only. Castings or metallic joints are known and in use of a form in which the front and rearward sections of the tug are attached to bars on opposite sides of a loop, in which flexion may occur in either direction, and is thus attended by the objections above referred to.

My invention is such that the parts to which the tug-sections are attached have a relation to the loop that prevents the inward flexion, and yet supplies all the requisites of such a joint, affording also greater facility for inserting the end of the leather tug through the loop than has heretofore been obtained, as hereinafter set forth.

Figure 1:
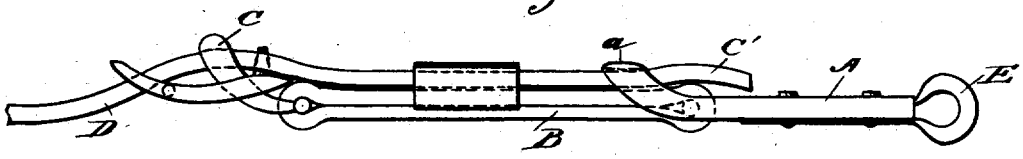
Figure 2:
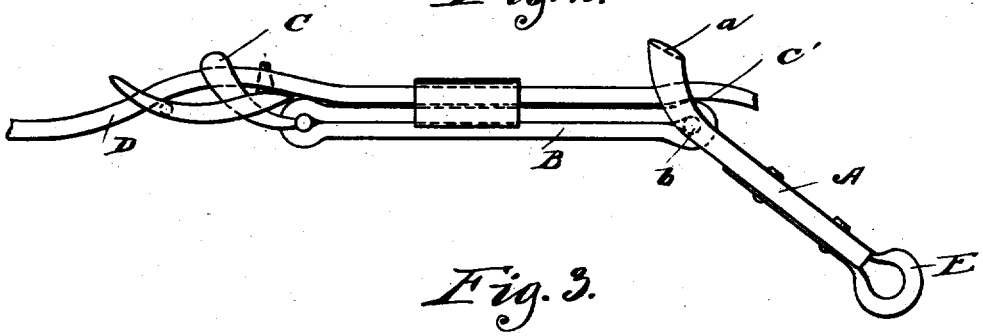
Figure 3:
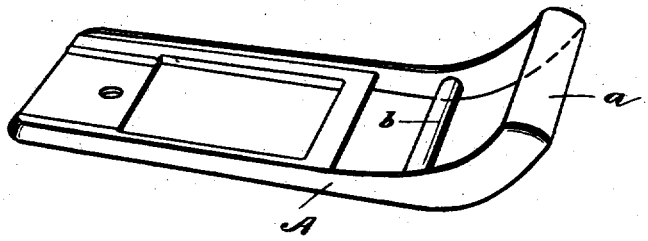

In the accompanying drawings, forming a part of this specification, Figure 1 is an edge elevation embracing a section of a tug with the parts in normal alignment. Fig. 2 is the same with a portion deflected. Fig. 3 is a perspective of a metallic section of the tug.

A represents the metallic tug-section, the formation of which constitutes the chief element of my improvement. A buckle, C, of well-known construction, connects the rear portion, D, of the tug with the front section, which latter consists of the division A, above named, and an intermediate division, B. The metallic section A is adapted to receive and have riveted or otherwise secured to it a clip, E, by means of which it may be attached to the hame. Plate or section A is suitably recessed—in the present example longitudinally—to receive the clip bifurcations and to admit of leather layers, if desirable. These features, however, are not essential to the purposes of my invention. The extremity *a* of the plate or division A serves as a loop for the insertion of the end of tug-section C, said loop, by a bend or curve of the plate, being located out of the plane of the principal or clip-receiving portion of said plate. The bar *b* in the plane, or practically so, of the straight portion of the plate, and at a suitable distance inwardly from loop *a*, serves as a means for pivotally connecting division A with division B, thus division A being considered as a lever in which clip E, as attached to the hame, is the fulcrum and the connection at bar *b* the power. It gives loop *a* as a weight, wherein a tension of the tug causes the loop to bear down against the end C′ of the rear part buckle, C, of the tug. It is thus obvious that when the positions of loop *a* and bar *b* are relatively correct the loop serves under tension of the tug to bind the end C′, as shown in Fig. 1. This, as apparent, serves to prevent flexion of the joint, excepting in one direction, as before stated. It is also obvious, as indicated in Fig. 2, that flexion of the joint *b* may be made in adjusting section C with relation to the front sections, in which the loop *a* is thrown outward, and ample room thus afforded for the insertion of end C′ without the obstruction offered by ordinary loops. Thus by a construction of the plate A so that the draft in each direction is from a point or points at one side only of the loop the latter may be extended to facilitate the insertion of the end of the tug-section, and also by this construction the inward flexion, as before stated, is prevented.

Having thus described my invention, what I claim, and desire to protect by Letters Patent, is—

A metallic hame-tug section, A, to form the portion of the draft-tug adjacent to the hame, and consisting of a flat rectangular frame or body portion having one of its ends adapted to receive a suitable clip, whereby to secure the section to the hame, the opposite end of said section being bent or curved upwardly to form a rigid loop, *a*, and a transverse bar, *b*, rigidly affixed in the frame or body portion intermediate the loop and the hame-attaching end of the section, which bar affords a means for pivotally attaching to said section the rearward leather portion of the tug, substantially as described.

JOHN G. MILLER.

In presence of—
WALTER E. PRICE,
JOHN YORKSHIRE.